UNITED STATES PATENT OFFICE 2,167,724

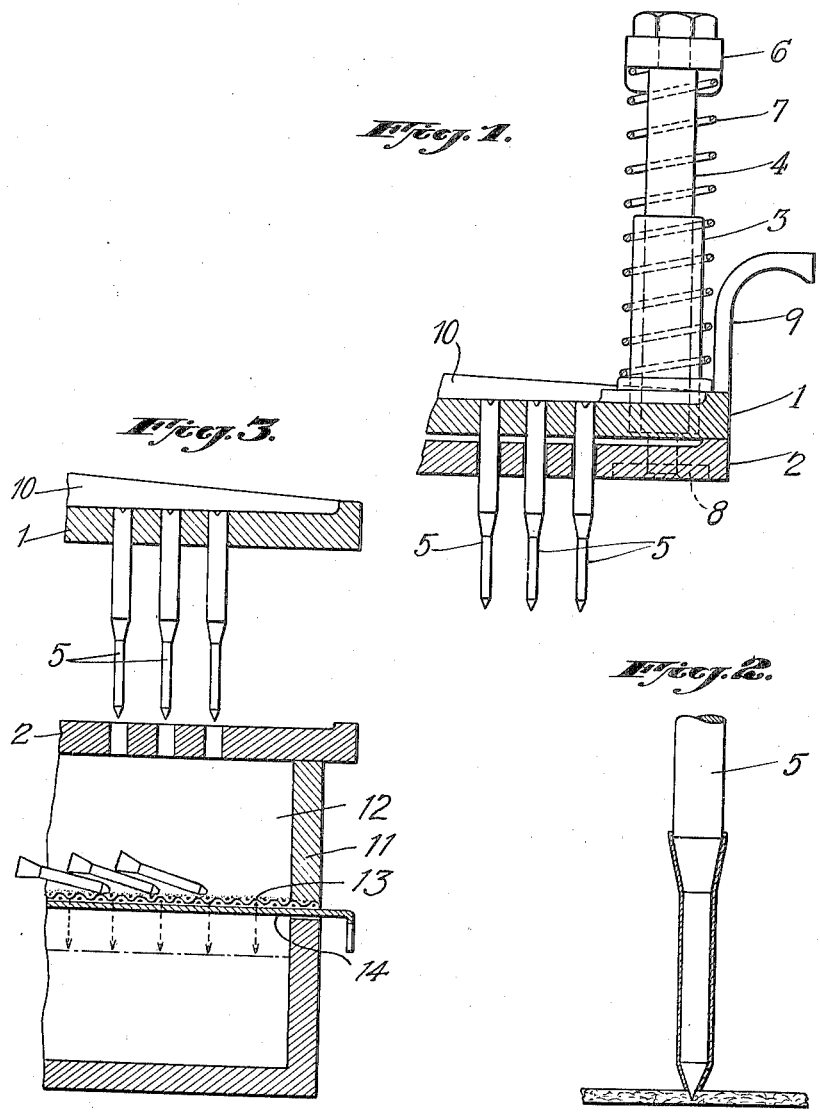

PROCESS FOR PRODUCTION OF HOLLOW ARTICLES

Edward Arthur Murphy, Wylde Green, Birmingham, Geoffrey W. Trobridge, Sutton Coldfield, and Joseph A. Andrews, West Quinton, Birmingham, England, assignors to Dunlop Rubber Company Limited, London, England, a British company Application June 3, 1936, Serial No. 83,204
In Great Britain August 10, 1935

8 Claims. (Cl. 18—58)

Our invention relates to improvements in methods for the production of hollow articles of or containing rubber or similar material from aqueous dispersions thereof by a dipping operation, and apparatus therefor.

The present invention has been found to be particularly useful in the production of hollow open articles of the aforesaid kind as, for example, small lengths of tube such as valve tubing.

The invention provides a simple and efficient process which permits the production simultaneously of a number of hollow articles of or containing rubber or similar material from aqueous dispersions thereof by allowing ready separation of the aforesaid hollow articles from their formers.

According to the present invention the process which permits the production of one or preferably simultaneously of a number of hollow articles from aqueous dispersions of suitable material, such as rubber, by a dipping operation comprises employing respectively one or more formers mounted in parallel relationship on a frame and capable of being moved backward and forwards relatively to and through a comparatively closely fitting perforation, or perforations, in a member such as a plate which, during deposition, is positioned between the frame and the depositing ends of the formers, forming by known dipping operations coagulated deposits on the depositing ends of the aforesaid formers, and thereafter separating the formers from their deposits by effecting movement of the frame relative to the member aforementioned.

After the coagulated deposits have been formed on the depositing ends of the formers, the formers are withdrawn from the perforated member either by moving the member relative to the frame, or by moving the frame relative to the member, thereby pressing the deposits against the aforesaid member and causing them to fall from the formers in due course. The separation of the deposits from their formers takes place because the diameter of the perforations in the member or plate aforementioned is sufficient to permit the formers to pass through, but the width of the perforations is insufficient to allow the passage therethrough of the formers and their deposits.

The stripping procedure described may be applied satisfactorily to any deposit whose shape and rigidity permit it to be separated from the former by the action of the stripping plate, that is to say, any deposit of uniform or suitably tapering section and of such rigidity as to overcome any tendency to crinkle or fold and enter the holes of the stripping plate.

The apparatus preferably employed for carrying out the process according to the invention comprises in combination a number of formers mounted on a frame and a member such as a plate provided with perforations of such diameter as closely to fit the formers aforesaid.

In the production of hollow open rubber articles according to the invention, these can be produced either, for example, by wiping the tip ends of the formers free from uncoagulated or semi-coagulated deposit or by employing formers provided with a pointed end and pressing the freshly coagulated deposit thereon against a sheet of some semi-resistant material such as cardboard.

The dispersions comprise natural or artificial aqueous dispersions of rubber or similar vegetable resins such as gutta-percha, balata, with or without the addition of aqueous dispersions of rubber-like substances such as the so-called synthetic rubbers, mineral rubber or rubber substitutes such as factice or rubber reclaim, or rubber waste or oils, for example, rape oil or vulcanized oils or cellulose esters or proteins, for example casein. All these and similar compositions are included under the general term "rubber compositions" in the following claims.

The dispersions may be concentrated or prevulcanized or compounded, or compounded and subsequently concentrated.

The compounding ingredients may be chosen from vulcanizing agents such as sulphur, and organic accelerators, fillers and reinforcing agents such as whiting, clay, barium sulphate, lithopone, lamp black, gas black, zinc oxide or powdered ebonite or vulcanite, coloring matters, preservatives or softeners.

Compounded concentrates such as are described in Patent No. 1,846,164 are particularly suitable for use.

Aqueous dispersions of synthetic rubber with or without any one or more of the hereinbefore mentioned compounding ingredients may also be used.

The various features of our invention are illustrated in connection with the accompanying drawing in which Fig. 1 is a vertical section of one end of apparatus for forming and handling tubular deposits from aqueous dispersions; Fig. 2 is a vertical section of a portion of the apparatus showing a means for forming openings in the lower ends of the deposits, and Fig. 3 is a view showing the rubber deposits as they are stripped from the formers.

In the apparatus of the accompanying drawing, a mounting plate 1 is provided in which a number of the formers are mounted, and immediately beneath this plate is provided a stripping plate 2. The mounting plate 1 is provided with a perforation and an upwardly extending guide collar 3 aligned therewith through which there extends from the stripper plate 2 a supporting rod 4, it being understood that one or more of these supporting rods may be thus mounted at each end of the stripper plate 2. The rod 4 and collar 3 are so positioned that spaced formers 5 projecting downwardly from the mounting plate 1 extend through similarly spaced openings in the stripper plate 2.

The rod 4 is slidable in the collar 3 so as to permit the stripper plate 2 to move upwardly and downwardly relatively to the mounting plate 1, and the openings about the formers 5 fit the latter so as to permit free movement and to strip off any deposits from the surface of the formers. Normally the stripper plate 2 is held upwardly against the mounting plate 1 by means of a crossbar or stop 6 which is urged upwardly by means of a spring 7 encircling the rod 4 and collar 3 and confined between the bar or stop 6 and the upper surface of the mounting plate 1. The rod 4 may be secured to the plate 2 in any suitable manner, such as by engaging a washer 8 countersunk into the plate 2. The plate 1 may be supported in suitable position above the surface of the aqueous dispersion by means of handles 9 which may rest on the upper edge of the dispersion container. In the case of a supporting plate 1 of considerable length as, for example, one carrying several hundred formers, sagging may be prevented by means of a reinforcing rib 10.

In using the above apparatus, the parts in the position shown in the drawing are lowered into a coagulating liquid until the formers 5 are wetted or coated with the coagulant and then dipped into an aqueous dispersion until a deposit is formed on the formers, whereupon the stripper plate 2 is lowered against the action of the spring 7. This pushes the deposits downwardly from the formers.

Any suitable coagulating liquid or composition may be employed as, for example, one of the following composition:

| | Parts by volume |
|---|---|
| Water | 20 |
| 80% acetic acid | 25 |
| .880 ammonia solution | 5 |
| Methylated spirits | 50 |

After being dipped into this solution and slowly withdrawn, the bottoms of the formers 5 are wiped dry on a porous pad, for example, unsized paper. The formers 5 are then held immersed to a depth of three quarters of an inch for thirty seconds in a latex mixing of the following composition:

| | Parts by weight |
|---|---|
| Rubber (as 60% latex) | 100 |
| Sulphur | 2 |
| Zinc oxide | 1 |
| Zinc diethyl dithiocarbamate | 1 |
| Mineral oil | 5 |

Total solids content 62% by weight.
Ammonia content 0.1% $NH_3$ by weight.

and withdrawn slowly. The bottoms are again wiped clear, after which the deposits are dipped momentarily into the same coagulant solution and withdrawn. The apparatus is then placed in a shallow tray 11 so that the perforated stripper plate 2 rests on the edges of the tray. The tray contains zinc stearate powder 12 and has a wire mesh bottom 13 which is temporarily covered with a slidable plate 14.

After the deposits have been in contact with the zinc stearate powder for about thirty seconds, they are stripped from the formers 5 by withdrawing the formers from the deposits. The slidable plate is then drawn out, the zinc stearate powder allowed to fall through the wire mesh into another tray, and the shallow tray containing the 700 pieces of valve tubing is then placed in a vulcanizing chamber.

*Example 2*

In the production of valve tubing it has been found desirable to omit entirely the wiping operations described in the previous example. This can be done by employing formers provided with a pointed end of apical angle of about 60°. The dipping operations can be carried out as described in Example 1. The opening of the end of the deposits is, however, formed as follows: Shortly after the deposits have been removed from the coagulant solution the apparatus is pressed against a sheet of cardboard so that the points of the formers are forced into the cardboard to a depth of about $\frac{1}{16}$ of an inch. This procedure perforates the ends of the coagulated deposits and expands the resulting orifice to a convenient size. The deposits are then stripped and finished as in the previous example.

What we claim is—

1. A process for the production of hollow articles from an aqueous dispersion of rubber composition by dipping which comprises coating a dipping former with a coagulant, dipping the coated former in the aqueous dispersion to form thereon a coagulated hollow deposit of rubber having an inner diameter which at each level is at least as great as that at any lower level wiping the tip ends of the said formers free from deposit and drawing the former through a perforation through which it extends to engage the upper edge of the coagulated deposit throughout its circumference and to strip the coagulated deposit from the former and thereafter vulcanizing the deposit.

2. A process for the production of hollow articles from an aqueous dispersion of rubber composition by dipping which comprises dipping a former into the aqueous dispersion to form thereon a hollow deposit of rubber composition having an inner diameter which at any level is at least as great as that at any lower level wiping the tip ends of the said formers free from deposit, coagulating said deposit and drawing the former through a perforation through which said former extends to engage the upper edge of the unvulcanized coagulated deposit throughout its circumference and to strip the coagulated deposit from the former.

3. A process for the production of hollow articles from an aqueous dispersion of rubber composition by dipping which comprises dipping a former into the aqueous dispersion to form thereon a hollow deposit of rubber composition having an inner diameter which at any level is at least as great as that at any lower level wiping the tip ends of the said formers free from deposit, coagulating said deposit and drawing the former through a perforation through which said former extends to engage the upper edge of the coagulated deposit throughout its circumference and to strip the coagulated deposit from the former and thereafter vulcanizing said deposit.

4. A process for the production of hollow rubber articles of tubular or tapering shape from aqueous dispersions of rubber material by dipping which comprises dipping formers in an aqueous dispersion, coagulating the resulting deposits on the formers, wiping the tip ends of the said formers free from deposit and thereafter stripping said fresh deposits from the formers.

5. A process for the production of hollow rubber articles of tubular or tapering shape from aqueous dispersions of rubber material by dipping which comprises dipping pointed formers into the aqueous dispersion, coagulating the resulting deposits on the formers, pressing the freshly coated deposit on said pointed end against a sheet of semi-resistant material to push said deposits from said pointed end and drawing the formers through closely fitting perforations to strip said fresh deposits from the formers.

6. A process for the production of hollow rubber articles of tubular or tapering shape from aqueous dispersions of rubber material by dipping which comprises coating a pointed former with a coagulant, dipping the coated former into the aqueous dispersion of rubber to form thereon a coagulated hollow deposit of rubber having an inner diameter which at each level is at least as great as that at any lower level, coagulating the coated deposits on the formers, pressing the freshly coated deposit on said pointed end against a sheet of semi-resistant material to push said deposits from said pointed end and drawing the formers through a perforation through which it extends to engage the upper edge of the coagulated deposit throughout its circumference and to strip the coagulated deposit from the former and thereafter vulcanize said deposit.

7. A process for the production of hollow articles from an aqueous dispersion of rubber composition by dipping which comprises dipping a pointed former into the aqueous dispersion to form thereon a hollow deposit of rubber composition having an inner diameter which at any level is at least as great as that at any lower level, coagulating said deposit, pressing the freshly coated deposit on said pointed end against a sheet of semi-resistant material to push said deposit from said pointed end and drawing the former through a perforation through which said former extends to engage the upper end of the unvulcanized coagulated deposit throughout its circumference and to strip the coagulated deposit from the former.

8. A process for the production of hollow articles from an aqueous dispersion of rubber composition by dipping which comprises dipping a pointed former into the aqueous dispersion to form thereon a hollow deposit of rubber composition having an inner diameter which at any level is at least as great as that at any lower level, coagulating said deposit, pressing the freshly coated deposit on said pointed end against a sheet of semi-resistant material to push said deposit from said pointed end and drawing the former through a perforation through which it extends to engage the upper edge of the coagulated deposit throughout its circumference and to strip the coagulated deposit from the former and thereafter vulcanizing said deposit.

EDWARD ARTHUR MURPHY.
GEOFFREY W. TROBRIDGE.
JOSEPH A. ANDREWS.